US010609111B2

(12) United States Patent
Bowen

(10) Patent No.: US 10,609,111 B2
(45) Date of Patent: Mar. 31, 2020

(54) CLIENT-DRIVEN, ABR FLOW RATE SHAPING

(71) Applicant: Cisco Technology, Inc., San Jose, CA (US)

(72) Inventor: Gareth Bowen, Chandlers Ford (GB)

(73) Assignee: Cisco Technology, Inc., San Jose, CA (US)

( * ) Notice: Subject to any disclaimer, the term of this patent is extended or adjusted under 35 U.S.C. 154(b) by 312 days.

(21) Appl. No.: 15/663,626

(22) Filed: Jul. 28, 2017

(65) Prior Publication Data

US 2019/0037003 A1   Jan. 31, 2019

(51) Int. Cl.
*H04L 29/08* (2006.01)
*H04L 12/825* (2013.01)
*H04L 29/06* (2006.01)
*H04L 12/811* (2013.01)
*H04L 12/853* (2013.01)
*H04L 12/841* (2013.01)
*H04L 12/801* (2013.01)
*H04L 12/815* (2013.01)

(52) U.S. Cl.
CPC ........ *H04L 67/02* (2013.01); *H04L 29/08099* (2013.01); *H04L 47/22* (2013.01); *H04L 47/2416* (2013.01); *H04L 47/25* (2013.01); *H04L 47/263* (2013.01); *H04L 47/283* (2013.01); *H04L 47/29* (2013.01); *H04L 47/38* (2013.01); *H04L 65/4076* (2013.01); *H04L 65/602* (2013.01); *H04L 65/604* (2013.01); *H04L 65/607* (2013.01); *H04L 65/80* (2013.01); *H04L 67/025* (2013.01); *H04L 47/12* (2013.01); *H04L 65/608* (2013.01)

(58) Field of Classification Search
CPC ... H04L 67/02; H04L 29/08099; H04L 47/25; H04L 65/602; H04L 47/12; H04L 67/025; H04L 65/607; H04L 47/38; H04L 65/4076; H04L 65/604; H04L 65/80; H04L 65/608
See application file for complete search history.

(56) References Cited

U.S. PATENT DOCUMENTS

2013/0097309 A1* 4/2013 Ma .................... H04L 29/08099
                                                                    709/224
2013/0138828 A1* 5/2013 Strasman ........... H04N 21/2385
                                                                    709/231
2013/0308699 A1* 11/2013 Musser, Jr. ............ H04N 19/85
                                                                    375/240.03

OTHER PUBLICATIONS

Jonathan Corbet, "3.13 Merge window, part 1," LWN.net [Accessed Online—Jul. 27, 2017] https://lwn.net/Articles/573272/.
Ghobadi et al., "Trickle: Rate Limiting YouTube Video Streaming," University of Toronto, 2012, 10 pages.

* cited by examiner

*Primary Examiner* — Kim T Nguyen
(74) *Attorney, Agent, or Firm* — Patterson + Sheridan, LLP

(57) ABSTRACT

Systems, methods, and computer program products to perform an operation comprising receiving, by a media server from a client device, a first hypertext transfer protocol (HTTP) request specifying a first transfer rate for a first segment of a plurality of segments of an adaptive bitrate (ABR) video, determining, by the media server, a first expected transfer rate for transferring the first segment of the ABR video, transmitting, by the media server to the client device, a first HTTP response specifying the first expected transfer rate, and transmitting, by the media server to the client device, the first segment of the ABR video via a network.

17 Claims, 10 Drawing Sheets

CLIENT-DRIVEN, ABR FLOW RATE SHAPING

TECHNICAL FIELD

Embodiments presented in this disclosure generally relate to streaming content. More specifically, embodiments disclosed herein relate to techniques for client-driven adaptive bitrate (ABR) flow rate shaping for streaming content.

BACKGROUND

As video transmission systems have matured, digital video is more readily available via a variety of different communications systems and networks. Specifically, digital video, such as television programs, movies, and sporting events, can be transmitted to users over networks, such as the Internet. In many instances, content providers can provide multiple Adaptive Bitrate (ABR) streams for a single video and/or broadcast channel. Generally speaking, multiple different ABR streams (e.g., at varying bitrates) can be provided for each of a plurality of videos and/or broadcast channels.

It is generally preferable for a client device to display the highest quality video stream possible. However, since network resources and processing capabilities can vary greatly between client devices, the appropriate video stream can vary greatly between client devices. As an example, a very high bitrate encoding may be appropriate for a dedicated streaming device on a high-speed network, while a relatively lower bitrate encoding may be appropriate for a mobile device on a mobile network. As such, by providing multiple encodings at varying bitrates for each video or broadcast channel, content providers can better ensure that client devices can retrieve a stream that is tailored to the particular client device.

Conventionally, however, client devices are not actively involved in determining the transfer rates for a given ABR video stream. When requesting to view a video, the client devices are not aware of how rapidly a server will try to send the video, which will tend to differ from the encoding rates. Instead, the client devices can only observe and react to how fast the server sends the video. Doing so often leads to "bursty" transfer rates between the client devices and server, which is less desirable than constant transfer rates.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

Description of Example Embodiments

Overview

Figure 1:
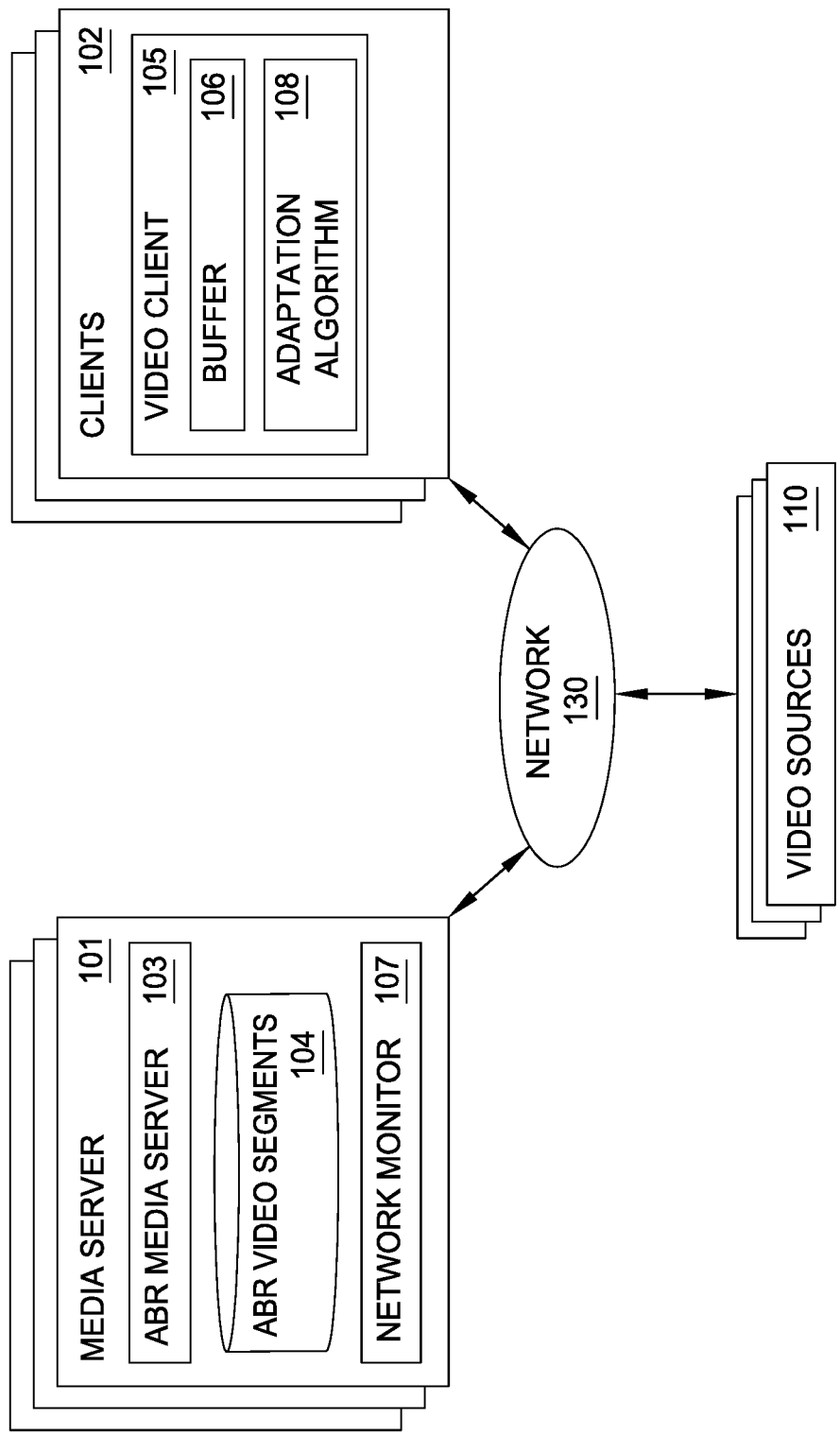
FIG. 1 illustrates a system for delivering encoded video streams to client devices using client-driven flow rate shaping, according to one embodiment.

According to one embodiment of the present disclosure, a method comprises receiving, by a media server from a client device, a first hypertext transfer protocol (HTTP) request specifying a first transfer rate for a first segment of a plurality of segments of an adaptive bitrate (ABR) video, determining, by the media server, a first expected transfer rate for transferring the first segment of the ABR video, transmitting, by the media server to the client device, a first HTTP response specifying the first expected transfer rate, and transmitting, by the media server to the client device, the first segment of the ABR video via a network In another embodiment, a media server comprises a processor and a memory containing a program which when executed by the processor performs an operation comprising receiving, by the media server from a client device, a first hypertext transfer protocol (HTTP) request specifying a first transfer rate for a first segment of a plurality of segments of an adaptive bitrate (ABR) video, determining, by the media server, a first expected transfer rate for transferring the first segment of the ABR video, transmitting, by the media server to the client device, a first HTTP response specifying the first expected transfer rate, and transmitting, by the media server to the client device, the first segment of the ABR video via a network In another embodiment, a computer program product comprises a non-transitory computer readable medium storing instructions, which, when executed by a processor, performs an operation comprising receiving, by a media server from a client device, a first hypertext transfer protocol (HTTP) request specifying a first transfer rate for a first segment of a plurality of segments of an adaptive bitrate (ABR) video, determining, by the media server, a first expected transfer rate for transferring the first segment of the ABR video, transmitting, by the media server to the client device, a first HTTP response specifying the first expected transfer rate, and transmitting, by the media server to the client device, the first segment of the ABR video via a network.

Example Embodiments

Embodiments disclosed herein provide enhanced techniques for transferring ABR video by allowing client devices to engage in the determination of data transfer rates. Generally, the client device and sending device engage in a communications loop that allows the client to specify a download rate that is different than the encoding rate (the bitrate) of the video. Furthermore, the sender notifies the client of an expected transfer rate it expects to transfer the requested video at. Doing so allows the client to determine whether the actual transfer rate is different than the expected transfer rate, and react accordingly, e.g., by requesting different transfer rates, requesting different encoding rates for the video, and the like. Furthermore, doing so facilitates smoother transfer rates of ABR video by the sender device to client devices.

FIG. 1 illustrates a system 100 for delivering encoded video streams to client devices using client-driven flow rate shaping, according to one embodiment. As shown, the system 100 includes one or more media servers 101, one or more client devices 102, and one or more video sources 110 communicably coupled via a network 130. In some embodiments, the video sources 110 are not visible by the client devices 102. As shown, the media server 101 includes an ABR media server 103, a data store of ABR video segments 104, and a network monitor 107. Generally, the media server 101 may be any type of device configured to serve ABR video files to the client devices 102, such as a server, router, and the like. The ABR media server 103 is a software component configured to service requests for ABR video segments 104 from the client devices 102. The ABR video segments 104 stores segments of encoded ABR video. Although depicted as a data store resident in the media server 101, the ABR video segments 104 is also representative of streams of ABR video data (e.g., live video channels). The network monitor 107 is generally configured to monitor the state of the network 130 to determine network state information, such as current levels of congestion, transfer rates, network retransmission rates, network latency, bandwidth (e.g., of a network connection of the client devices 102 and/or the media server 101), and the like.

In digital video production, a master video file (or a master video stream) is provided at a high resolution, e.g., by a video source 110. An encoder (not pictured) may then encode the master video file or video stream at multiple different bitrates. For example, a master video may be encoded at a relatively high bitrate, a relatively moderate bitrate, and a relatively low bitrate. The master video may therefore be encoded at three different bitrates. Furthermore, the encoded master video may be divided into a plurality of segments, or files, of fixed size. The ABR video segments 104 are representative of such encoded video segments. For a given video, a content provider may also provide a manifest file. The manifest file specifies the different encoding bitrates a given video or stream is available in, where each different encoding bitrate may be referred to as a "profile." For example, a manifest may specify a 1 megabit/second encoding profile, a 4 megabit/second encoding profile, and so on. In at least one embodiment, the manifest file for each video or stream is stored with the ABR video segments 104.

As shown, each client 102 includes a video client 105, which is an application configured to playback ABR video segments 104 received from the media server 101 on a display device (not pictured). The video client 105 includes a buffer 106 and an adaptation algorithm 108. The buffer 106 stores the received ABR video segments 104. When the buffer 106 includes at least a portion of an ABR video segment 104, at least some of the contents of the buffer 106 are decoded by a decoder, which is then outputted for display on a display device. The adaptation algorithm 108 is configured to modify the requested transfer rate and/or requested bitrate of ABR video segments 104 over time.

Generally, when the video client 105 requests an ABR video from the media server 101, the media server 101 transmits the manifest file to the video client 105. The video client 105 is configured to process the manifest file and to determine which bitrates are available for the corresponding video. Conventionally, the video client 105 further determines which of the bitrates is appropriate for the corresponding client device 102. For example, a mobile client device could be configured to select the relatively low bitrate encoding, while a dedicated video streaming device on a high-speed network connection could be configured to select the relatively high bitrate encoding. In some embodiments, the video client 105 may specify the requested encoding rate based on a specified URL. For example, to get a 3 Mb/s ABR segment 104, the client may request "www.example.com/content/3000000/segment3.ts", where the 3 Mb/s segment is identified based on the "3000000" in the URL. However, doing so allows no negotiation of the transfer rate by which the media server 101 will transfer the desired bitrate encoding from the ABR video segments 104.

Advantageously, however, the video client 105 is configured to specify, in a hypertext transfer protocol (HTTP) request header, a desired transfer rate for the requested video. In at least one embodiment, the desired transfer rate is specified in a custom HTTP transport-layer header. The desired transfer rate may be determined based on any number of factors, such as a speed of a network connection of the client device 102, the different bitrates of the requested video, current congestion in the network 130, and historical transfer rates experienced when downloading ABR video segments 104 from the media server 101. For example, the video client 105 of a client device 102 on a high-speed network connection may determine that a 10 megabit/second transfer rate is desired, and specify the desired transfer rate of 10 megabits per second in the HTTP header sent to the ABR media server 103. In response, the ABR media server 103 determines an expected transfer rate based on any number of factors, such as the number of client devices 102 currently receiving ABR video segments 104, the health and/or congestion of the network 130, an amount of system resources of the media server 101 being used, and the like. Continuing with the previous example, the ABR media server 103 may determine an expected transfer rate of 5 megabits per second, less than the 10 megabits per second requested by the video client 105. The ABR media server 103 then inserts an indication of the expected transfer rate in a header of an HTTP response sent to the requesting video client 105.

The ABR media server 103 may then begin transmitting one or more requested ABR video segments 104 to the video client 105. The video client 105 may then monitor the actual transfer rate realized when downloading the ABR video segments 104. Similarly, the media server 103 may monitor the actual transfer rate. For example, the video client 105 may determine that the actual transfer rate realized is 6 megabit per second, which is greater than the expected 5 megabit/second transfer rate specified by the ABR media server 103 in the HTTP header. In response, the video client 105 may increase the requested transfer rate in subsequent HTTP headers. In at least one embodiment, the video client 105 applies the adaptation algorithm 108 to determine whether to subsequently modify the requested transfer rate. Generally, the adaptation algorithm 108 considers any number of factors, such as the actual transfer rate(s), the expected transfer rate(s) previously advertised by the media server 103, the requested transfer rate(s), and the like. For example, one adaptation algorithm 108 may determine the actual transfer rate, smooth the actual transfer rate based on previously observed transfer rates, determine an updated transfer rate based on the smoothed transfer rate, and schedule the next HTTP request for another ABR video segment 104.

The video client 105 also monitors the status of the buffer 106. For example, the video client 105 may determine whether the fill level of the buffer 106 exceeds a threshold at given time intervals. Doing so allows the video client 105 and/or the adaptation algorithm 108 to consider the fill state of the buffer 106 to refine the transfer rate over time. In at least one embodiment, the transfer rate is refined gradually over time, thereby avoiding traffic spikes on the network 130.

The video client 105 may also include logic configured to determine, based on the current actual transfer rate, whether to subsequently select a higher or lower encoding bitrate ABR video profile. For example, a threshold transfer rate value may be applied to each available encoded bitrate profile for an ABR video. For example, if the ABR video has relatively high, medium, and low encoded bitrate profiles, example threshold transfer rates may be 0.5 megabits/second, 5 megabits/second, and 10 megabits/second, respectively. In such an example, a video client 105 receiving ABR video segments 104 from the medium profile may eventually experience actual transfer rates that exceed 10 megabits per second. In response, the video client 105 may determine to subsequently request ABR video segments 104 from the high bitrate profile. Similarly, minimum transfer rate thresholds may apply for each ABR bitrate profile. If the actual transfer rates fall below the corresponding minimum transfer rate threshold, the video client 105 may subsequently request ABR video segments 104 from a relatively lower bitrate profile (e.g., move from the 5 megabit/second bitrate profile to the 0.5 megabit/second bitrate profile).

Figure 2A:
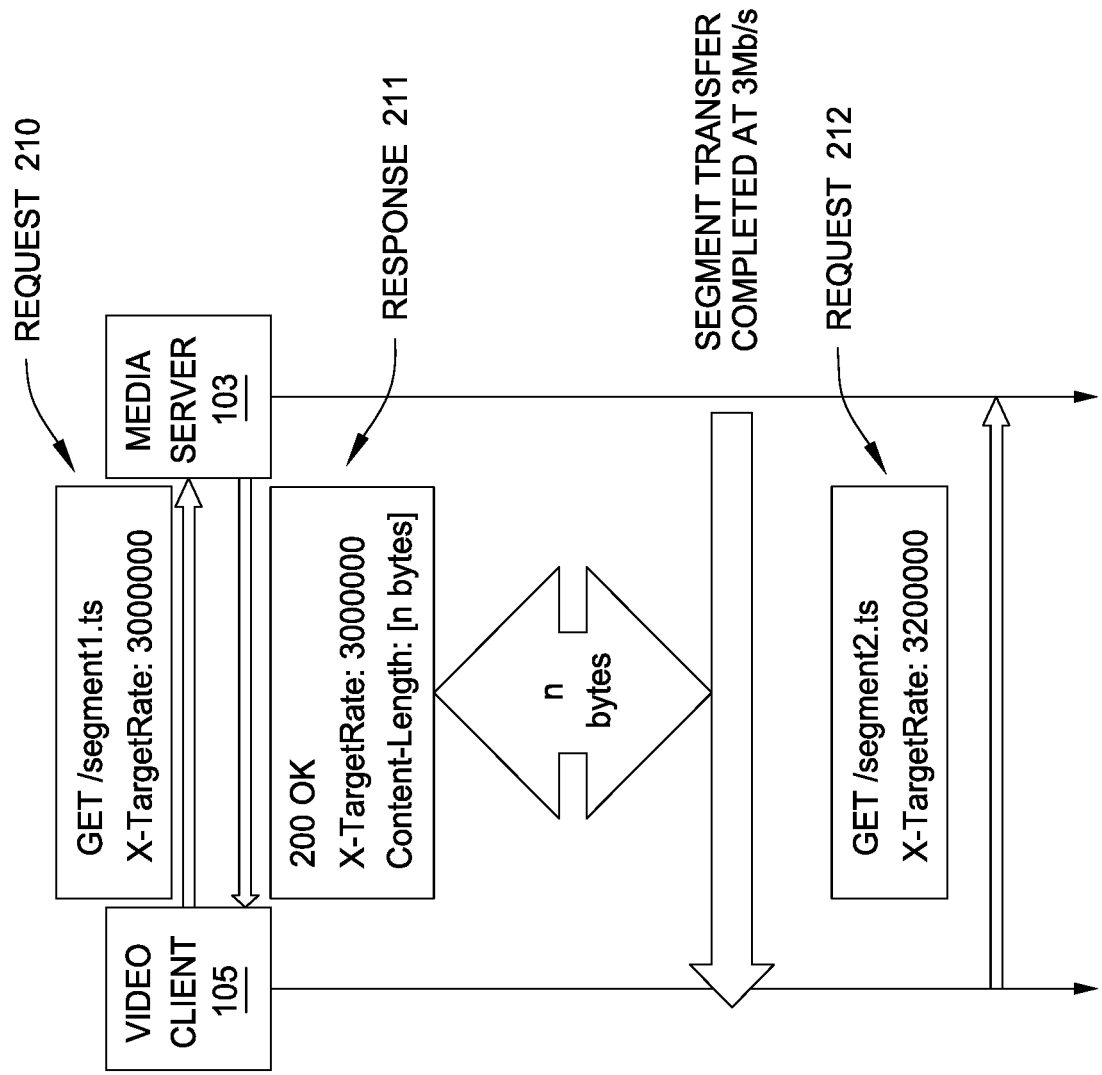
FIGS. 2A-2D illustrate example techniques for implementing client-driven ABR flow rate shaping, according to one embodiment.

FIG. 2A illustrates example techniques for implementing client-driven ABR flow rate shaping, according to one embodiment. As shown, FIG. 2A depicts an example video client 105 transmitting an example HTTP request 210 to the media server 103. As shown, the HTTP request 210 specifies a requested ABR video segment 104 having an example name of "segment1.ts". The HTTP request 210 further specifies a custom transport layer header for requested transfer rates having an example name of "X-TargetRate" and a corresponding value of 3000000 bits per second. Thus, the request header specifies that the video client 105 requests to download segment1.ts at a rate of 3 megabits per second. As previously stated, the video client 105 determines the requested transfer rate on any number of factors, such as the speed of the network connection for the corresponding device 102, network latency, attributes of the device 102 (e.g. form factor, display resolution, etc.), available system resources of the device 102, and the like.

Responsive to receiving the request 210, the media server 103 generates a response 211. The response 211 includes an example HTTP header value of 3000000 bits per second for the "X-TargetRate", indicating that the media server 103 expects to serve segment1.ts at 3 megabits per second. As previously stated, the media server 103 determines the expected transfer rate value based on any number and type of factors, such as network congestion, available system resources of the media server 101, a number of client devices 102 currently receiving ABR video segments 104, and the like. Therefore, in one embodiment, FIG. 2A reflects an embodiment where the media server 103 has generated an expected transfer rate value matching the transfer rate requested by the video client 105.

The media server 103 then begins transferring segment1.ts, which as shown, completes downloading at 3 megabits per second. In response, the video client 105 may apply the adaptation algorithm 108 to determine whether to modify the requested transfer rate value in subsequent HTTP requests (e.g., to download the next ABR video segment 104). For example, because the actual transfer rate met the requested and expected transfer rates, the video client may generate a request 212 specifying to download segment2.ts at 3200000 bits per second. The media server 103 would then respond with an expected transfer rate value, and transfer segment2.ts to the video client 105. Generally, this process may continue until the video client 105 stops requesting ABR video segments 104. It is noted that the requested, expected, and actual transfer rates may or may not match the encoding bitrates of the selected ABR video.

Figure 2B:
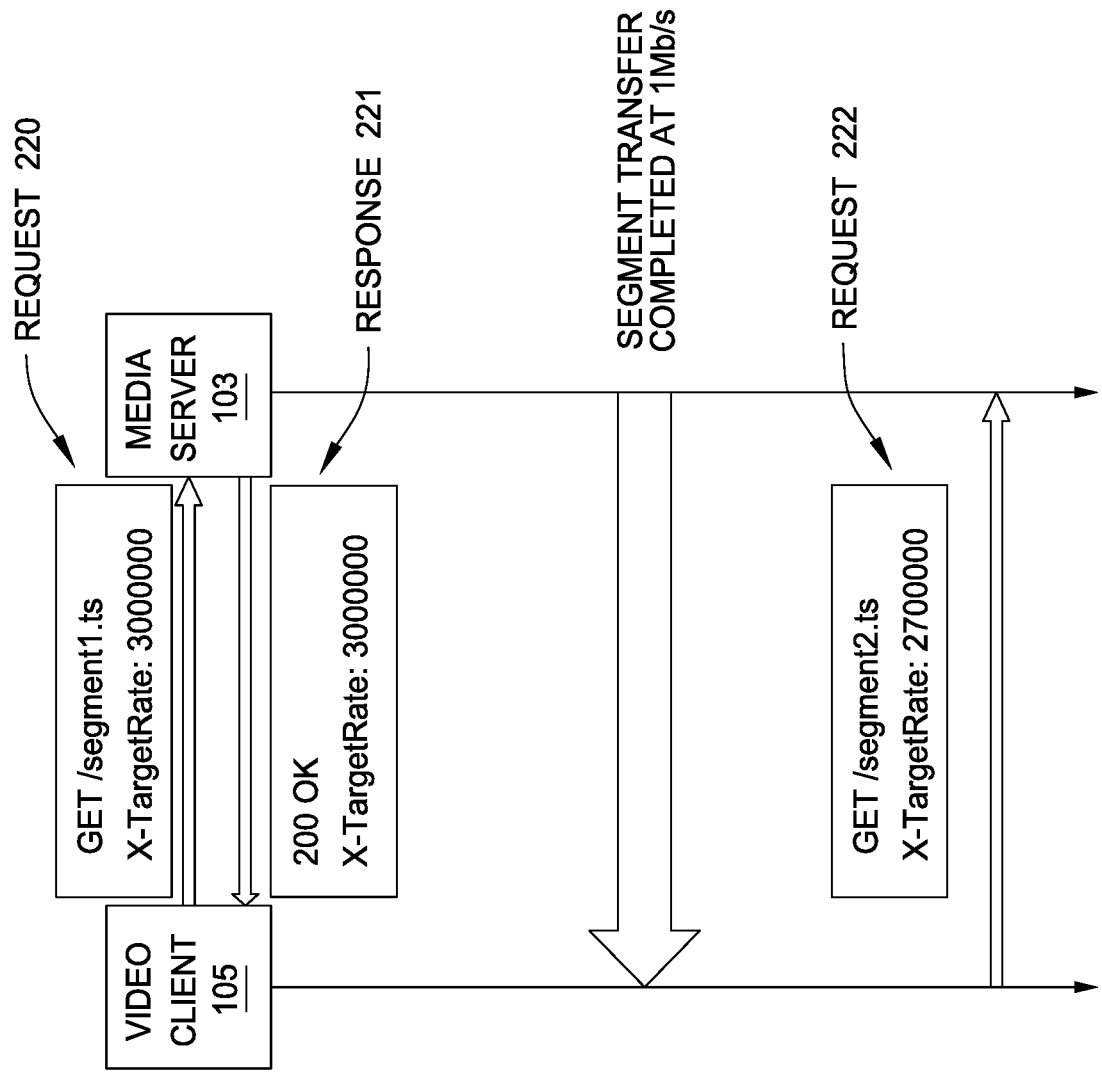

FIG. 2B depicts an embodiment where the network 130 is constrained, and as a result, the expected transfer rate advertised by the media server 103 is not met. As shown, the video client 105 generates an HTTP request 220 specifying to download segment1.ts at 3000000 bits per second. As shown, the media server 103 generates a response 221 specifying that the media server 103 expects to transfer segment1.ts at 3000000 bits per second.

However, as shown, the transfer completes at 1 megabit per second, e.g., because the network is congested. Therefore, the video client 105 applies the adaptation algorithm 108, which determines to specify a requested transfer rate of 2700000 bits per second in the request 222 for segment2.ts. Doing so reduces the requested rate in a smooth fashion, rather than immediately reducing the requested rate to the actual 1 megabit per second rate. However, in other embodiments, the adaptation algorithm 108 may determine to again request 3000000 bits per second, or any other transfer rate (e.g., 2900000 bits per second, etc.).

Figure 2C:
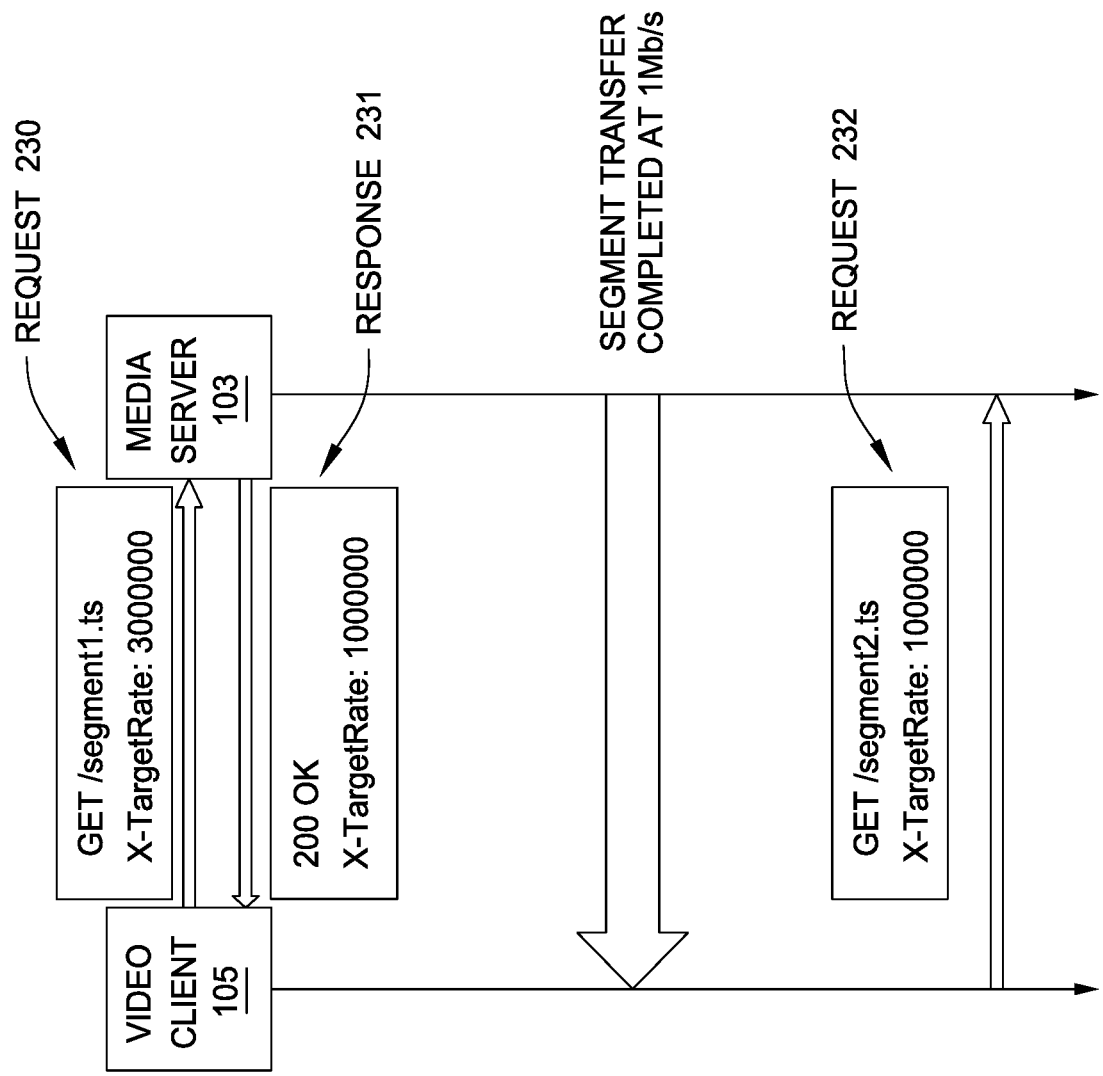

FIG. 2C depicts an embodiment where the media server 101 (and/or media server 103) is constrained. For example, the media server 101 may be experiencing resource (e.g., CPU, RAM, network I/O, etc.) use levels that exceed a respective threshold, and as a result, the transfer rate advertised by the video client 105 is not accepted. As shown, the video client 105 generates an HTTP request 220 specifying to download segment1.ts at 3000000 bits per second. Because the media server 103 (and/or the media server 101) is constrained, the media server 103 generates a response 221 specifying that the media server 103 expects to transfer segment1.ts at 1000000 bits per second.

However, as shown, the transfer completes at 1 megabit per second, e.g., because the network is not congested, even though the media server 101 is constrained. Therefore, the video client 105 applies the adaptation algorithm 108, which determines to specify a requested transfer rate of 1000000 bits per second in the request 232 for segment2.ts. However, in other embodiments, the adaptation algorithm 108 may determine to again request 3000000 bits per second, or any other transfer rate.

Figure 2D:
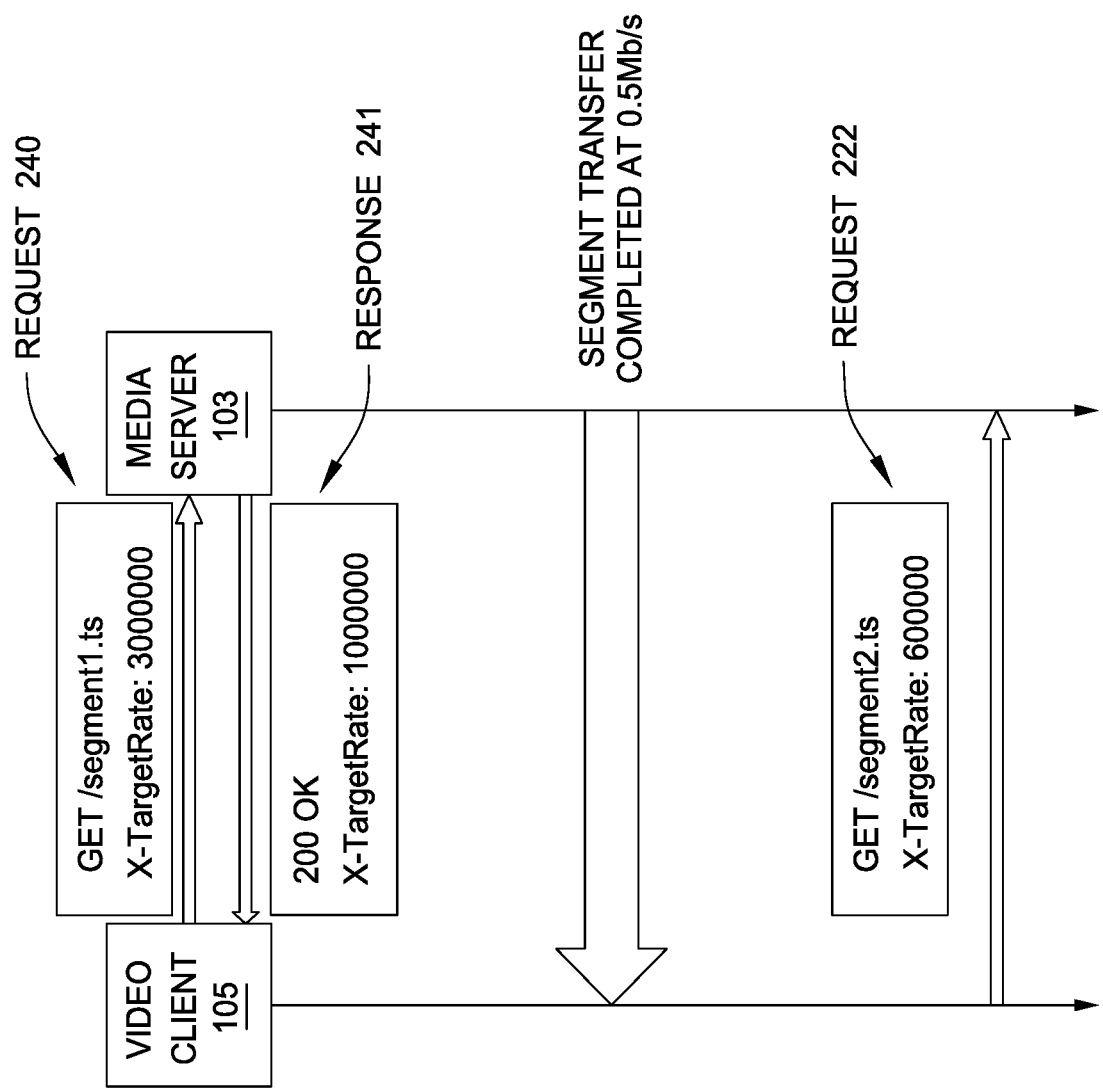

FIG. 2D depicts an embodiment where the network 130 and media server 101 (and/or media server 103) are constrained, and as a result, the transfer rate advertised by the video client 105 is not accepted. As shown, the video client 105 generates an HTTP request 220 specifying to download segment1.ts at 3000000 bits per second. Because the network 130 is congested and the media server 103 (and/or the media server 101) is constrained, the media server 103 generates a response 221 specifying that the media server 103 expects to transfer segment1.ts at 1000000 bits per second.

However, as shown, the transfer completes at 0.5 megabits per second, e.g., because the network is congested. Therefore, the video client 105 applies the adaptation algorithm 108, which determines to specify a requested transfer rate of 600000 bits per second in the request 242 for segment2.ts. However, in other embodiments, the adaptation algorithm 108 may determine to again request 3000000 bits per second, or any other transfer rate.

Figure 3:
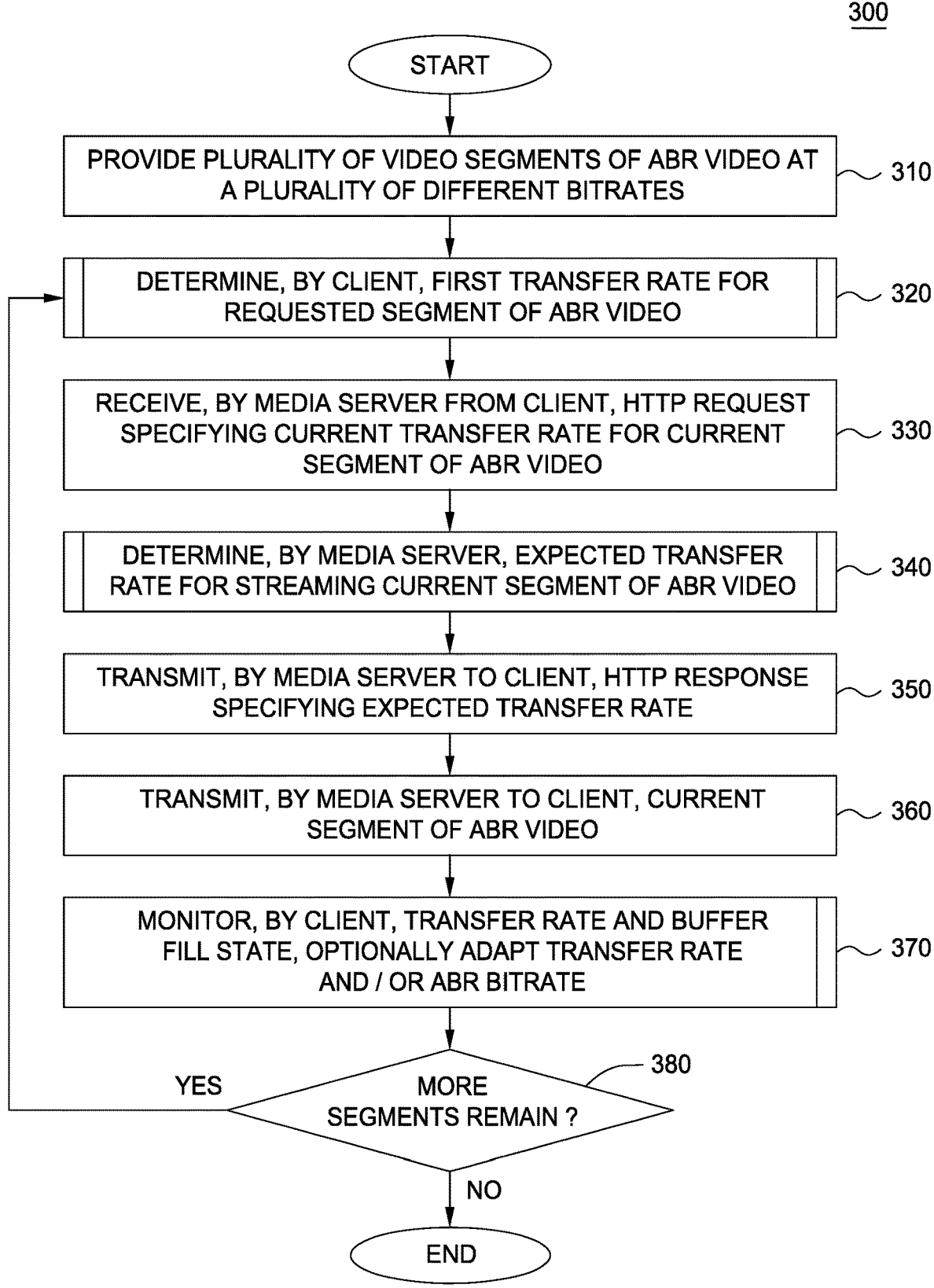
FIG. 3 is a flow chart illustrating a method to provide client-driven ABR flow rate shaping, according to one embodiment.

FIG. 3 is a flow chart illustrating a method 300 to provide client-driven ABR flow rate shaping, according to one embodiment. As shown, the method 300 begins at block 310, where a plurality of different encoding bitrate profiles are provided for each of a plurality of videos. Each video at each bitrate may be divided in time into a respective plurality of ABR video segments 104 (where each segment corresponds to a respective file). At block 320, described in greater detail with reference to FIG. 4, the video client 105 determines a current transfer rate for a currently requested ABR video segment 104. For example, a user may desire to watch a video of a sporting event. The video client 105 may determine to request a first ABR video segment 104 of the video of the sporting event at a first transfer rate, such as 5 megabits per second. At block 330, the media server 103 receives, from the video client 105, an HTTP request specifying the first transfer rate for the current ABR video segment 104. At block 340, described in greater detail with reference to FIG. 5, the media server 103 determines an expected transfer rate for streaming the current ABR video segment 104. For example, if the network 130 is congested, the media server 103 may determine an expected transfer rate of 4 megabits/second.

At block 350, the media server 103 transmits an HTTP response to the video client 105 specifying the expected transfer rate determined at block 340. At block 360, the media server 103 transmits the current ABR video segment 104 to the video client 105. At block 370, described in greater detail with reference to FIG. 6, the video client 105 monitors the actual transfer rate at which the current ABR video segment 104 is received, and monitors the fill state of the buffer 106. The video client 105 may also determine to modify subsequently requested transfer rates and/or encoding bitrate profiles. At block 380, the video client 105 determines whether more ABR video segments 104 remain for downloading. If more ABR video segments 104 remain, the method returns to block 320. However, in some embodiments, if the video client 105 modifies the transfer rate at block 370, the method returns to block 330. If no more additional ABR video segments 104 remain (e.g., the user and/or the video client 105 has stopped playback of the video, the video has finished playing, etc.), the method 300 ends.

Figure 4:
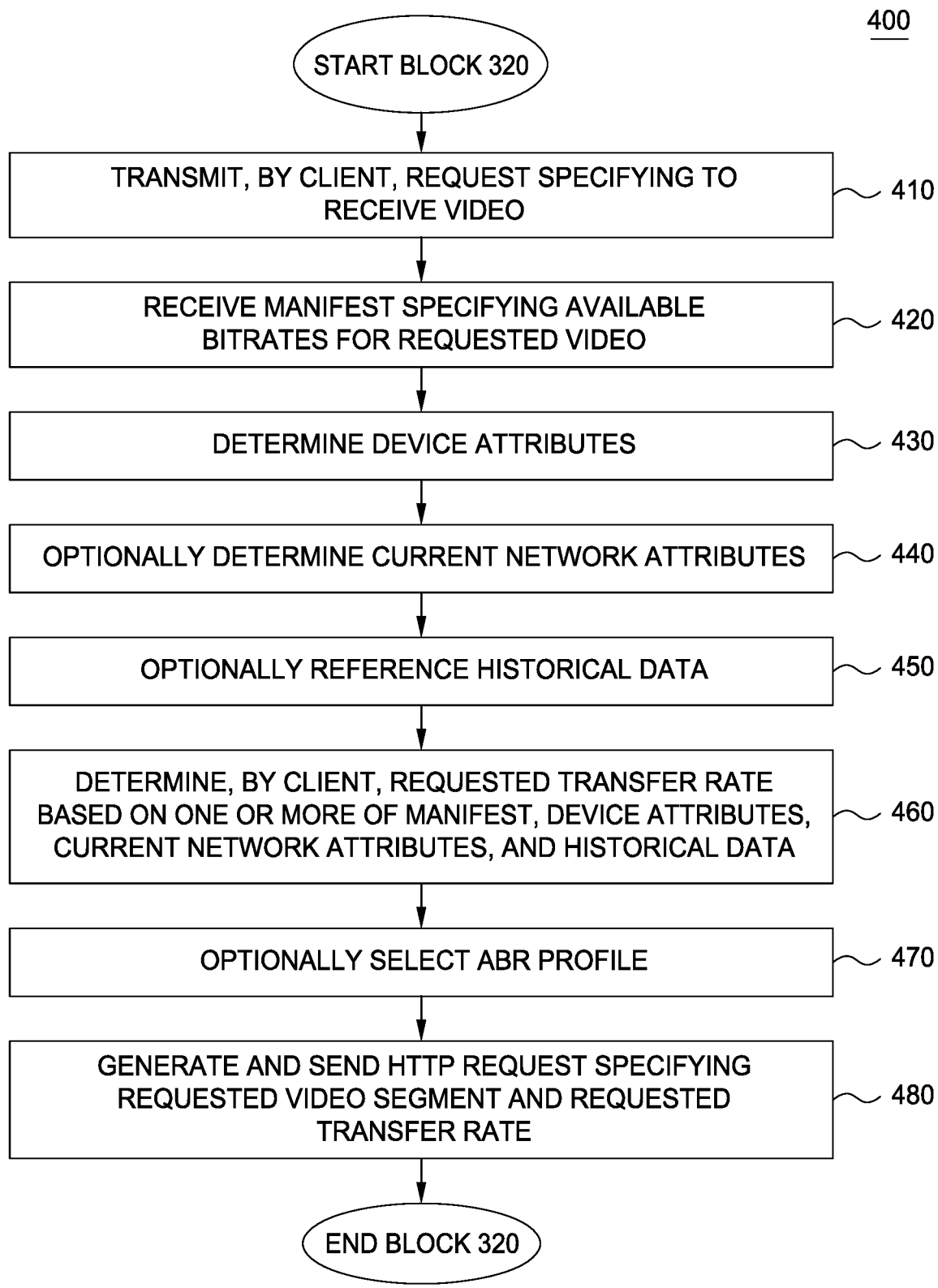
FIG. 4 is a flow chart illustrating a method to determine a transfer rate for a segment of ABR video, according to one embodiment.

FIG. 4 is a flow chart illustrating a method 400 corresponding to block 320 to determine a transfer rate for a segment of ABR video, according to one embodiment. As shown, the method 400 begins at block 410, where the video client 105 transmits a request to the media server 103 to receive a video. In at least one embodiment, the request is transmitted responsive to user input specifying to play the video. At block 420, the video client 105 receives, from the media server 103, a manifest file specifying the available bitrates for the requested video. At block 430, the video client 105 determines the attributes of the client device 102 on which the video client 105 is executing. The attributes may include, without limitation, a type of the client device 102, a type of a display device of the client device 102, a resolution of the display device, available system resources on the client device 102, a network connection speed of the client device 102, and the like.

At block 440, the video client 105 optionally determines the current attributes of the network 130. For example, the video client 105 may include a network monitor 107 that allows the video client 105 to monitor the status of the network 130. Doing so may allow the video client 105 to determine current transfer rates on the network 130, whether the network 130 is congested, a latency of the network 130, and any other type of network state information. At block 450, the video client 105 optionally references historical data reflecting previously experienced download rates when receiving ABR video segments 104 from the media server 103. At block 460, the video client 105 determines a requested transfer rate for downloading an ABR media segment 104 from the media server 103. The video client 105 may determine the requested transfer rate based on one or more of the available encoding bitrate profiles specified in the manifest, the determined device attributes, the determined network attributes, and the historical data. For example, if the client device 102 has a high-speed network connection, a large high-resolution display, and the video client 105 has previously downloaded ABR video segments 104 from the media server 103 at 10 megabits per second, the video client 105 may determine a transfer rate of 10 megabits per second. At block 470, the video client 105 may optionally select an ABR profile from the manifest. Continuing with the previous example, the video client 105 may select a high-bitrate encoding profile from the manifest. As previously stated, the selected ABR encoding profile may be reflected by the URL requested by the video client 105. At block 480, the video client 105 generates and sends an HTTP request to the media server 103 specifying the requested ABR video segment 104 and the requested transfer rate. As previously stated, in some embodiments, the requested transfer rate is specified in a custom transport layer HTTP header.

Figure 5:
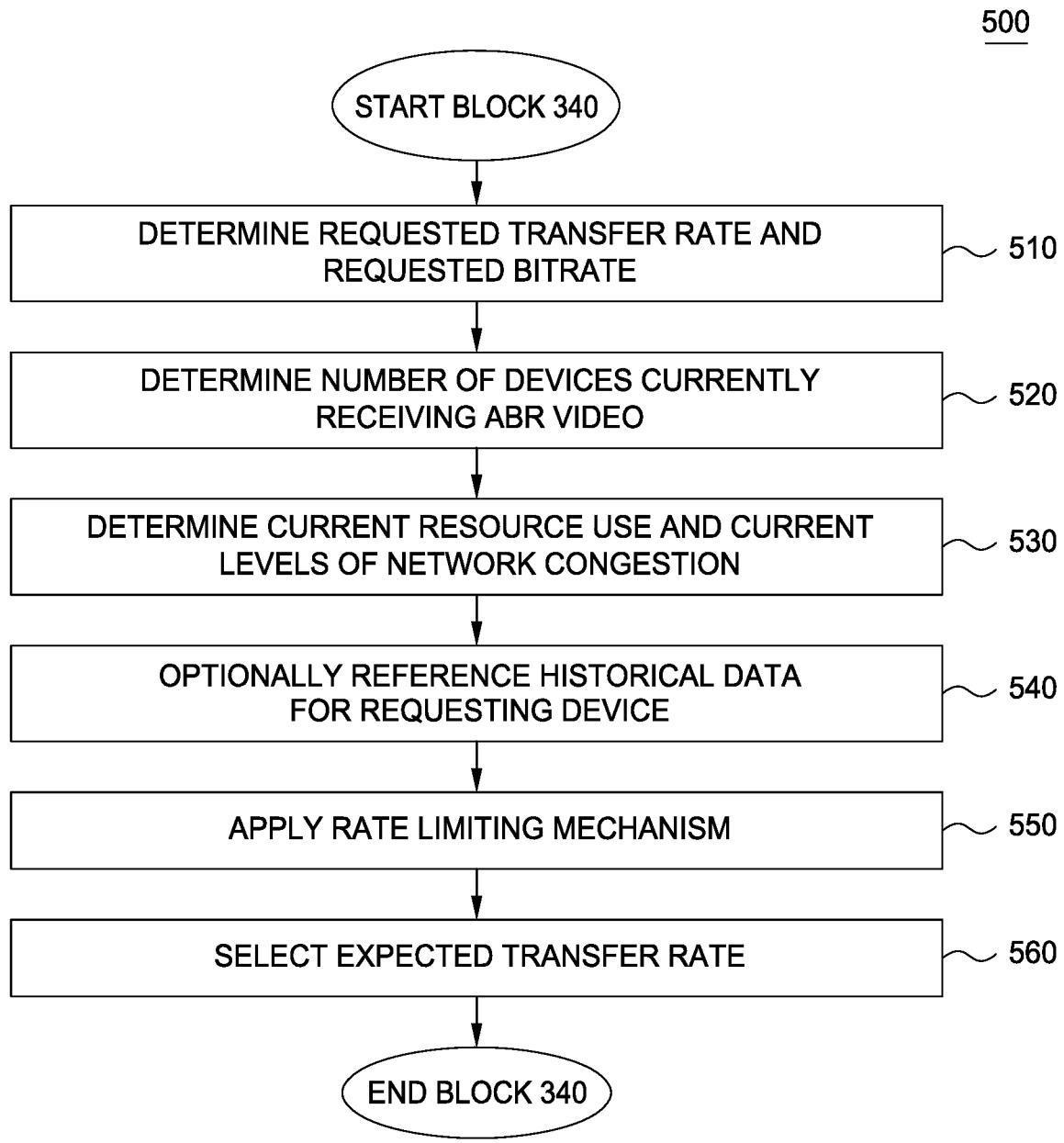
FIG. 5 is a flow chart illustrating a method to determine an expected transfer rate for streaming segments of ABR video, according to one embodiment.

FIG. 5 is a flow chart illustrating a method 500 corresponding to block 340 to determine an expected transfer rate for streaming segments of ABR video, according to one embodiment. As shown, the method 500 begins at block 510, where the media server 103 determines the requested transfer rate specified in the HTTP request by the video client 105. The media server 103 also determines the bitrate of the ABR video segment 104 requested by the video client 105. At block 520, the media server 103 determines the number of devices 102 currently receiving ABR video segments 104. Generally, as more devices 102 are receiving video, the media server 103 may lower the expected transfer rate. Similarly, as fewer devices 102 are receiving video, the media server 103 may increase the expected transfer rate.

At block 530, the media server 103 determines the current levels of resource use on the media server 101. Generally, the media server 103 determines the current levels of use of CPU, memory, I/O, network interface bandwidth, and any other physical and/or virtual resource of the media server 101. The media server 103 also invokes the network monitor 107 to determine the current levels of congestion of the network 130, as well as any other attribute of the network 130, such as available bandwidth, latency, etc. The media server 103 may also compare the levels of resource use to a respective resource use threshold. If one or more levels of resource use exceed the respective threshold, the media server 103 may determine that the requested transfer rates cannot be satisfied due to constrained resources, and determine a lower expected transfer rate. At block 540, the media server 103 optionally references stored historical data reflecting actual transfer rates experienced in transferring ABR video segments 104 to the requesting device 102. At block 550, the media server 103 optionally applies a rate limiting mechanism. The rate limiting mechanism may generally limit the amount of resources allocated to a requesting client device 102. At block 560, the media server 103 determines an expected transfer rate for the requested ABR media segment 104. For example, if the network 130 is congested and system resources are constrained, the media server 103 may select a relatively low expected transfer rate. Similarly, if the network 130 is not congested and system resources are not constrained, the media server 103 may select a relatively high expected transfer rate.

Figure 6:
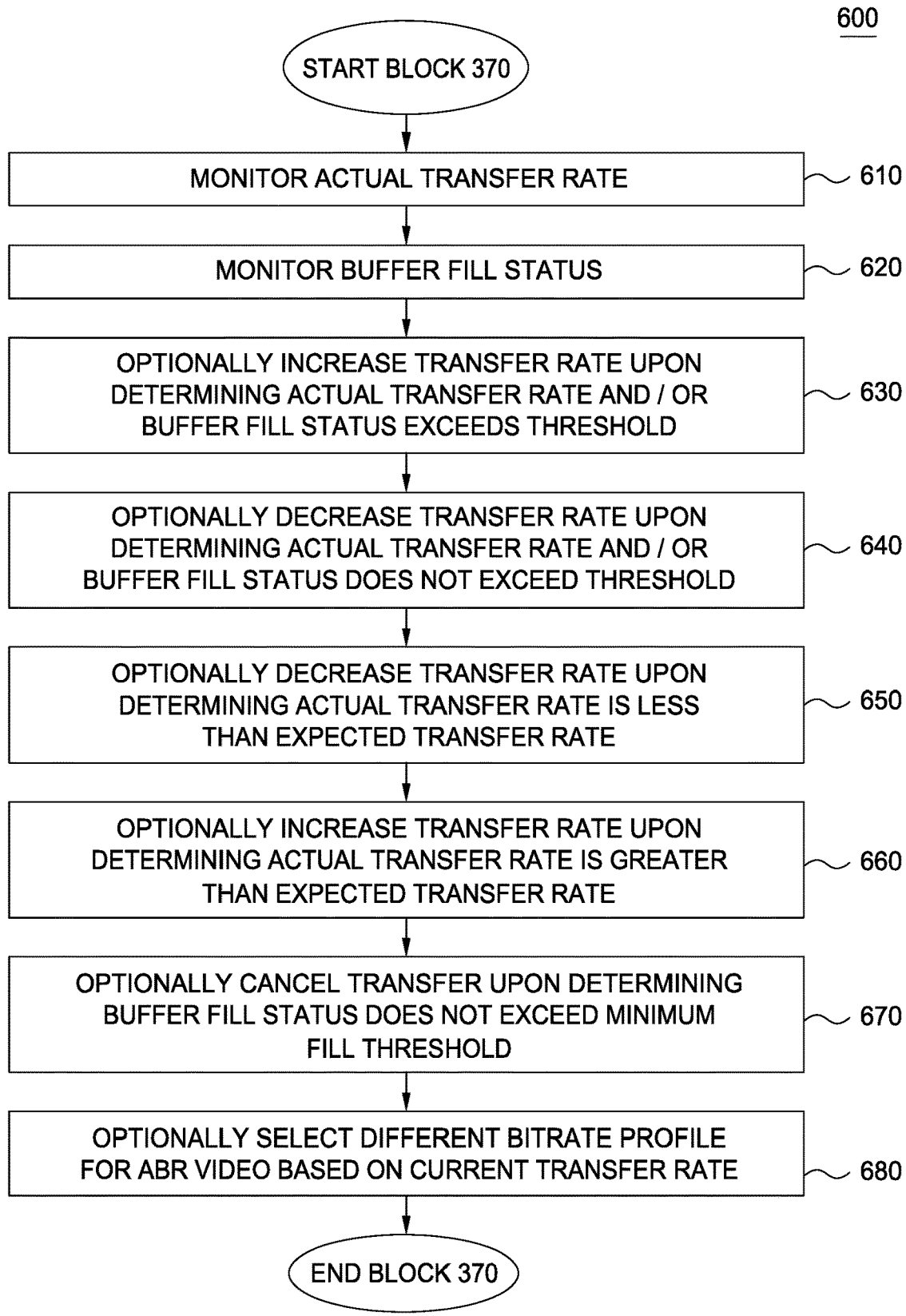
FIG. 6 is a flow chart illustrating a method to monitor buffer fill state and optionally adapt a transfer rate for streaming ABR video, according to one embodiment.

FIG. 6 is a flow chart illustrating a method 600 corresponding to block 370 to monitor buffer fill state and optionally adapt a transfer rate for streaming ABR video, according to one embodiment. As shown, the method 700 begins at block 710, where the video client 105 monitors the actual transfer rate of ABR video segments 104. At block 620, the video client 105 monitors the fill status of the buffer 106. At block 630, the video client 105 and/or the adaptation algorithm 108 optionally increases the transfer rate for downloading subsequent ABR video segments 104 upon determining that the actual transfer rate exceeds a threshold and/or the fill status of the buffer 106 exceeds a threshold. At block 640, the video client 105 and/or the adaptation algorithm 108 optionally decreases the transfer rate for downloading subsequent ABR video segments 104 (or completing the download of a current ABR video segment 104) upon determining that the actual transfer rate does not exceed a threshold and/or the fill status of the buffer 106 does not exceed a threshold.

At block 650, the video client 105 and/or the adaptation algorithm 108 optionally decreases the transfer rate upon determining the actual transfer rate is less than expected transfer rate specified by the media server 103. At block 660, the video client 105 and/or the adaptation algorithm 108 optionally increases the transfer rate upon determining the actual transfer rate is greater than expected transfer rate specified by the media server 103. At block 670, the video client 105 and/or the adaptation algorithm 108 optionally cancels the transfer of the current ABR video segment 104 upon determining the fill status of the buffer 106 does not exceed a minimum fill threshold. Doing so may prevent underruns of the buffer 106. At block 680, the video client 105 and/or the adaptation algorithm 108 optionally selects a different encoding bitrate profile for the ABR video based on the current transfer rate. For example, if the video client 105 initially requested a 5 megabit transfer rate and a medium encoding bitrate profile, and the video client 105 subsequently determines to request a 10 megabit transfer rate, a higher encoding bitrate profile may be selected. Doing so may improve the viewing experience of the user.

Figure 7:
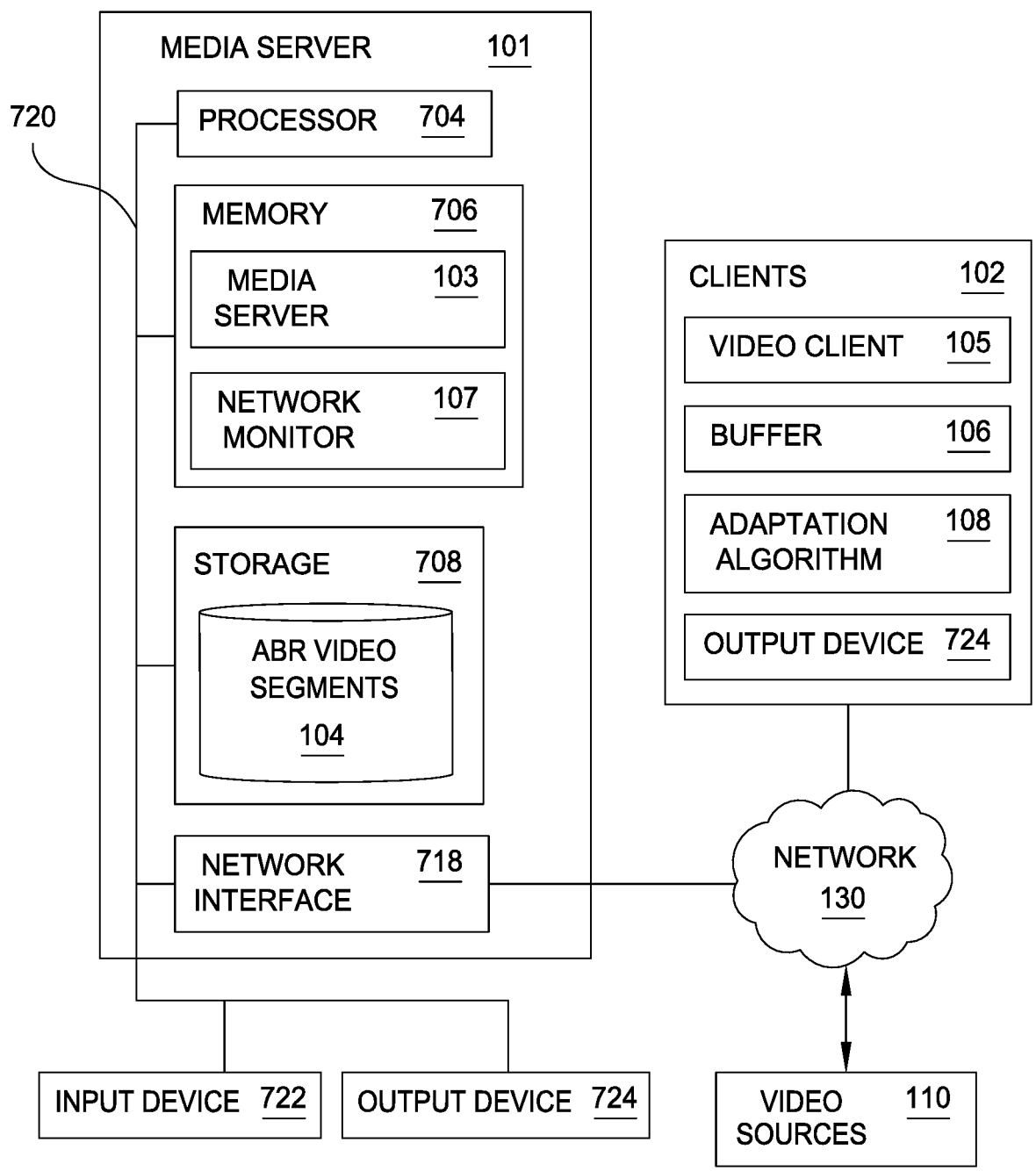
FIG. 7 is a block diagram illustrating a system which provides client-driven ABR flow rate shaping, according to one embodiment.

FIG. 7 is a block diagram illustrating a system 700 which provides client-driven ABR flow rate shaping, according to one embodiment. The networked system 700 includes the media server 101. The media server 101 may also be connected to other computers and devices via the network 130, such as the client devices 102 and the video sources 110. In general, the network 130 may be a telecommunications network and/or a wide area network (WAN). In a particular embodiment, the network 130 is the Internet.

The media server 101 generally includes a processor 704 which obtains instructions and data via a bus 720 from a memory 706 and/or a storage 708. The media server 101 may also include one or more network interface devices 718, input devices 722, and output devices 724 connected to the bus 720. The media server 101 is generally under the control of an operating system (not shown). Examples of operating systems include the UNIX operating system, versions of the Microsoft Windows operating system, and distributions of the Linux operating system. More generally, any operating system supporting the functions disclosed herein may be used. The processor 704 is a programmable logic device that performs instruction, logic, and mathematical processing, and may be representative of one or more CPUs. The network interface device 718 may be any type of network communications device allowing the media server 101 to communicate with other computers via the network 730.

The storage 708 is representative of hard-disk drives, solid state drives, flash memory devices, optical media and the like. Generally, the storage 708 stores application programs and data for use by the media server 101. In addition, the memory 706 and the storage 708 may be considered to include memory physically located elsewhere; for example, on another computer coupled to the media server 101 via the bus 720.

The input device 722 may be any device for providing input to the media server 101. For example, a keyboard and/or a mouse may be used. The input device 722 represents a wide variety of input devices, including keyboards, mice, controllers, and so on. Furthermore, the input device 722 may include a set of buttons, switches or other physical device mechanisms for controlling the media server 101. The output device 724 may include output devices such as monitors, touch screen displays, and so on.

As shown, the memory 706 contains the media server 103 and the network monitor 107, described in greater detail above. As shown, the storage 708 contains the ABR video segments 104. As shown, the client devices 102 include the video client 105, the buffer 106, the adaptation algorithm 108, and an output device 724. The client devices 102 and video sources 110 include a processor, memory, network interface, and storage, each not pictured for the sake of clarity.

Advantageously, embodiments disclosed herein provide techniques to allow client devices to shape the transfer rates of ABR videos over a network. Specifically, by decoupling the transfer rates and bitrates, the overall performance of the network, servers, and devices is improved.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

I claim:

1. A method, comprising:
   receiving, by a media server from a client device, a first hypertext transfer protocol (HTTP) request specifying a first transfer rate for a first segment of a plurality of segments of an adaptive bitrate (ABR) video;
   determining, by the media server, a first expected transfer rate for transferring the first segment of the ABR video, comprising:
   determining a count of client devices receiving the ABR video from the media server;
   determining network state information of a network;
   determining a level of use of each of a plurality of system resources of the media server; and
   determining an encoded bitrate profile for the ABR video requested by the client device, wherein the first expected transfer rate is determined based on the count of client devices, the network state information, the level of use of each of the plurality of system resources, and the encoded bitrate profile for the ABR video;
   transmitting, by the media server to the client device, a first HTTP response specifying the first expected transfer rate; and
   transmitting, by the media server to the client device, the first segment of the ABR video via the network.

2. The method of claim 1, wherein the network state information comprises at least one of: (i) a measure of network congestion, (ii) a network retransmission rate, (iii) a bandwidth of a network interface of the media server, and (iv) a latency of the network.

3. The method of claim 1, wherein the first expected transfer rate is different than the requested first transfer rate.

4. The method of claim 1, wherein the client device determines the first requested transfer rate based on one or more of: (i) bandwidth of a network interface of the client device, (ii) a resolution of a display device communicably coupled to the client device, (iii) a level of use of each of a plurality of system resources of the client device, (iv) a plurality of attributes of the client device, (v) a plurality of different encoded bitrate profiles for the ABR video specified in a manifest file provided by the media server, and (vi) a fill level of a buffer of the client device.

5. The method of claim 1, further comprising:
receiving, by the media server from the client device, a second HTTP request specifying a second transfer rate for a second segment of the plurality of segments of the ABR video, wherein the second transfer rate is based on an actual transfer rate experienced when transmitting the first segment of the ABR video;
determining, by the media server, a second expected transfer rate for transferring the second segment of the ABR video, wherein the second expected transfer rate is based on the actual transfer rate experienced when transmitting the first segment of the ABR video;
transmitting, by the media server to the client device, a second HTTP response specifying the second expected transfer rate; and
transmitting, by the media server to the client device, the second segment of the ABR video via the network.

6. The method of claim 1, wherein the first transfer rate is specified in a transport layer header of the first HTTP request.

7. A non-transitory computer-readable storage medium storing instructions which when executed by a computer processor performs an operation comprising:
receiving, by a media server from a client device, a first hypertext transfer protocol (HTTP) request specifying a first transfer rate for a first segment of a plurality of segments of an adaptive bitrate (ABR) video;
determining, by the media server, a first expected transfer rate for transferring the first segment of the ABR video, comprising:
determining a count of client devices receiving the ABR video from the media server;
determining network state information of a network;
determining a level of use of each of a plurality of system resources of the media server; and
determining an encoded bitrate profile for the ABR video requested by the client device, wherein the first expected transfer rate is determined based on the count of client devices, the network state information, the level of use of each of the plurality of system resources, and the encoded bitrate profile for the ABR video;
transmitting, by the media server to the client device, a first HTTP response specifying the first expected transfer rate; and
transmitting, by the media server to the client device, the first segment of the ABR video via the network.

8. The computer-readable storage medium of claim 7, wherein the network state information comprises at least one of: (i) a measure of network congestion, (ii) a network retransmission rate, (iii) a bandwidth of a network interface of the media server, and (iv) a latency of the network.

9. The computer-readable storage medium of claim 7, wherein the first expected transfer rate is different than the requested first transfer rate.

10. The computer-readable storage medium of claim 7, wherein the client device determines the first requested transfer rate based on one or more of: (i) bandwidth of a network interface of the client device, (ii) a resolution of a display device communicably coupled to the client device, (iii) a level of use of each of a plurality of system resources of the client device, (iv) a plurality of attributes of the client device, (v) a plurality of different encoded bitrate profiles for the ABR video specified in a manifest file provided by the media server, and (vi) a fill level of a buffer of the client device.

11. The computer-readable storage medium of claim 7, the operation further comprising:
receiving, by the media server from the client device, a second HTTP request specifying a second transfer rate for a second segment of the plurality of segments of the ABR video, wherein the second transfer rate is based on an actual transfer rate experienced when transmitting the first segment of the ABR video;
determining, by the media server, a second expected transfer rate for transferring the second segment of the ABR video, wherein the second expected transfer rate is based on the actual transfer rate experienced when transmitting the first segment of the ABR video;
transmitting, by the media server to the client device, a second HTTP response specifying the second expected transfer rate; and
transmitting, by the media server to the client device, the second segment of the ABR video via the network.

12. The computer-readable storage medium of claim 7, wherein the first transfer rate is specified in a transport layer header of the first HTTP request.

13. A media server, comprising:
one or more computer processors; and
a memory containing a program which when executed by the processors performs an operation comprising:
receiving, by the media server from a client device, a first hypertext transfer protocol (HTTP) request specifying a first transfer rate for a first segment of a plurality of segments of an adaptive bitrate (ABR) video;
determining, by the media server, a first expected transfer rate for transferring the first segment of the ABR video, comprising:
determining a count of client devices receiving the ABR video from the media server;
determining network state information of a network;
determining a level of use of each of a plurality of system resources of the media server; and
determining an encoded bitrate profile for the ABR video requested by the client device, wherein the first expected transfer rate is determined based on the count of client devices, the network state information, the level of use of each of the plurality of system resources, and the encoded bitrate profile for the ABR video;
transmitting, by the media server to the client device, a first HTTP response specifying the first expected transfer rate; and
transmitting, by the media server to the client device, the first segment of the ABR video via the network.

14. The media server of claim 13, wherein the network state information comprises at least one of: (i) a measure of network congestion, (ii) a network retransmission rate, (iii) a bandwidth of a network interface of the media server, and (iv) a latency of the network.

15. The media server of claim 13, wherein the first expected transfer rate is different than the requested first transfer rate, wherein the first transfer rate is specified in a transport layer header of the first HTTP request.

16. The media server of claim 13, wherein the client device determines the first requested transfer rate based on one or more of: (i) bandwidth of a network interface of the client device, (ii) a resolution of a display device communicably coupled to the client device, (iii) a level of use of each of a plurality of system resources of the client device, (iv) a plurality of attributes of the client device, (v) a plurality of different encoded bitrate profiles for the ABR video specified in a manifest file provided by the media server, and (vi) a fill level of a buffer of the client device.

17. The media server of claim 13, the operation further comprising:
receiving, by the media server from the client device, a second HTTP request specifying a second transfer rate for a second segment of the plurality of segments of the ABR video, wherein the second transfer rate is based on an actual transfer rate experienced when transmitting the first segment of the ABR video;
determining, by the media server, a second expected transfer rate for transferring the second segment of the ABR video, wherein the second expected transfer rate is based on the actual transfer rate experienced when transmitting the first segment of the ABR video;
transmitting, by the media server to the client device, a second HTTP response specifying the second expected transfer rate; and
transmitting, by the media server to the client device, the second segment of the ABR video via the network.

* * * * *